United States Patent [19]

Schlein

[11] 4,456,416
[45] Jun. 26, 1984

[54] ANCHOR NAIL FASTENER HAVING CHISEL POINT

[76] Inventor: Seymour N. Schlein, 19924 Edmundton, St. Clair Shores, Mich. 48080

[21] Appl. No.: 259,419

[22] Filed: May 1, 1981

[51] Int. Cl.³ ............................................. F16B 15/04
[52] U.S. Cl. .................................... 411/358; 411/447; 411/496
[58] Field of Search ............................... 411/356–358, 411/479, 487, 493, 496, 503, 447

[56] References Cited

U.S. PATENT DOCUMENTS

| | | | |
|---|---|---|---|
| 1,114,305 | 10/1914 | Starbuck | 411/358 |
| 2,677,298 | 5/1954 | Hebenstreit | 411/358 |
| 3,177,753 | 4/1965 | Maginnis | 411/358 |
| 3,188,904 | 6/1965 | Owen | 411/358 |
| 3,908,507 | 9/1975 | Solo | 411/496 |

*Primary Examiner*—Gary L. Smith
*Assistant Examiner*—Neill Wilson
*Attorney, Agent, or Firm*—Burton, Parker & Schramm

[57] ABSTRACT

The end of the nail guide and deflector tube of an anchor nail fastener is flattened to form a chisel point. The chisel point is oriented with respect to the nail exit side aperture of the tube to provide the most effective relationship between the laterally projecting anchor nail and the hole in the workpiece made by the tube.

3 Claims, 4 Drawing Figures

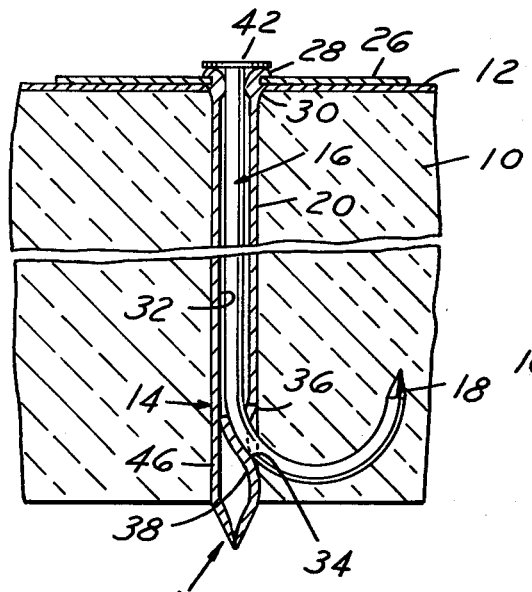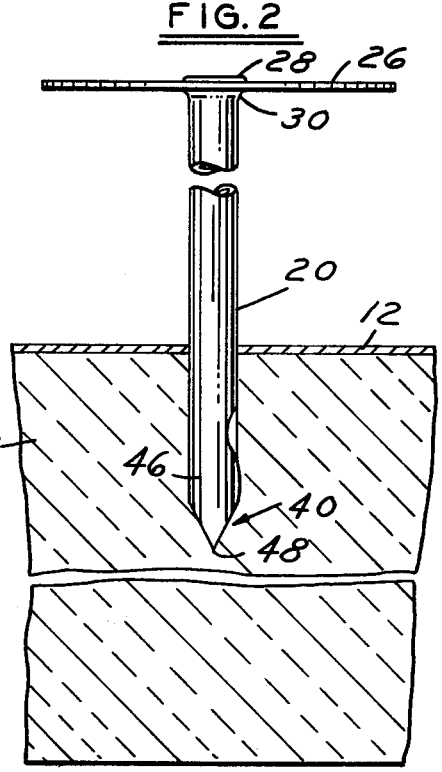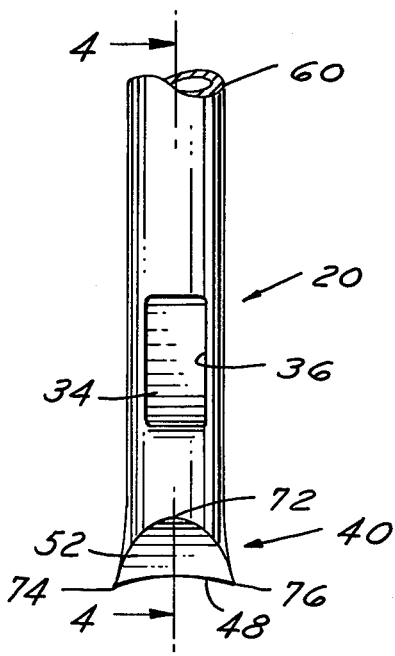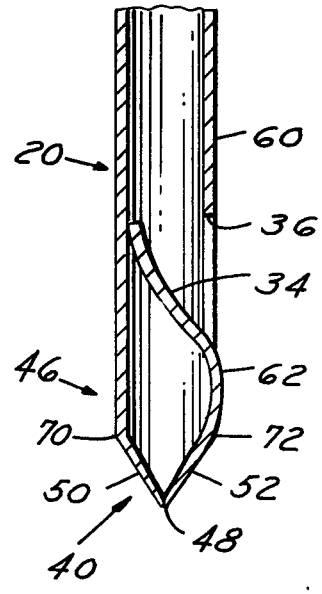

ANCHOR NAIL FASTENER HAVING CHISEL POINT

DESCRIPTION

1. Field of Invention

This invention relates to an improvement in Anchor Nail Fasteners, and in particular to improvements in the nail guide and deflector tube.

2. Prior Art

Anchor nail fasteners of the type to which this invention relates are shown in U.S. Pat. Nos. 3,177,753; 3,188,904; and 3,519,704 which are herein incorporated by reference.

While prior art anchor nail fasteners have performed acceptably, they have been limited to a relatively short nail guide and deflector tube such as 2" or less. There has been a need for an anchor nail fastener which is much longer, i.e., 6" or more, which will drive straight and make only a small hole so that its holding power is maximized.

OBJECTS

It is the primary object of this invention to provide an improved anchor nail fastener which is of greater length than the prior art fasteners, will drive straight, and is of improved holding power.

SUMMARY OF THE INVENTION

In carrying out my invention, the end of the nail guide and deflector tube is flattened to form a chisel point at the lower end of the tube. The chisel point permits the nail guide and deflector tube to be driven into workpieces straighter and form more tightly fitting holes. The knife edge of the chisel point, as it proceeds into the workpiece, severs the workpiece while the remainder of the chisel point thereafter spreads the workpiece for subsequent entry of the remainder of the nail guide and deflector tube.

In addition, the chisel point is oriented with respect to the nail exit side aperture of the tube to cause the most effective relationship between the laterally projecting anchor nail and the hole in the workpiece made by the tube.

BRIEF DESCRIPTION OF THE DRAWINGS

FIG. 1 is a cross-sectional view showing my improved anchor nail fastener in place;

FIG. 2 illustrates the driving of the nail guide and deflector tube into a substrate;

FIG. 3 is a front elevation of the lower of the nail guide and deflector tube of my invention; and FIG. 4 is a cross-sectional view taken on a line 4—4 of FIG. 3.

DETAILED DESCRIPTION OF PREFERRED EMBODIMENT

The fastener disclosed herein is particularly suitable for use with relatively porous building panels, such as panels formed of a relatively dense material, but with voids therein which prevent the satisfactory utilization of conventional nail type fasteners. While the fastener is particularly suitable for use with fiber board panels of the type sold under trade marks of Tectum Fiber Board Panels or Insulrock Fiber Board Panels, the fastener may be used with other types of board and applications for use with natural wood boards are feasible. The term "board", or "panel" as used herein is intended as a generic expression covering all materials for which the fastener may prove satisfactory. The insulation board or panel for which this fastener has been particularly designed may be of the type made of wood shavings held together by suitable binder. The fastener may be used to secure water proof paper, such as tar paper or the like, or other water proof coverings, upon insulation board, or to secure two boards together, either one or both of which boards may be dense material having voids preventing use of conventional nail type fasteners. The fastener may also find use in polyurethane foam or like materials for securing coverings, accessory items, or parts thereto. The nail also may find utilization in securing shingles or the like to porous roof or siding boards where conventional shingle nails would tend to pull loose.

FIG. 1, by way of example in solid outline, shows the fastener in place within a panel of insulation board 10 holding to the upper surface thereof a sheet of tar paper or the like 12. The board or panel 10 is of the aforementioned character comprising a relatively dense material held together with suitable binder and having voids therein. The panel 10 may be of one piece or may be of two pieces.

The fastener comprises a nail guide and deflector tube generally indicated at 14 and an anchor nail generally indicated at 16. As shown, the nail guide and deflector tube has been driven into the board 10. The nail 16 has been driven into the nail guide and deflector tube and its pointed end 18 has curled laterally outwardly and upwardly through a side opening aperture 36 on the tube and is imbedded in the board.

The nail guide and deflector perferrably comprises a tube 20 form of seamless steel tubing. Other forms of tubing may be found to be satisfactory but the seamless steel type has the requisite strength and rigidity particularly suited for the intended purpose herein disclose. Tubes of hardened carbon steel with a B-90 Rockwell Hardness serve well, especially for tubes of 6" or more in length which are unprecedented in the prior art. The tube is provided at its upper end with means for limiting its penetration through the board 10 and also for holding the tar paper 12 or other material which is to be secured to the board. Such means preferably comprises an annular flange or head 26 of washerlike shape which is secured rigidly to the upper end of the tube by upsetting the tube wall as at 28 and 30. The connection between the head 26 and the upper end of the tube is such as to prevent rain water, moisture, tar and the like from creeping over the upper surface of the head and down along the outside of the tube wall. This tight joint may be accomplished by upsetting the tube wall as shown with the upset portion tightly gripping head 26 at the opening therethrough through which the tube extends.

The tube is provided with an axial bore 32 which is substantially closed at the lower end by means providing a nail point deflecting surface 34. Such means comprises an inwardly deflected portion of the tube wall. Surface 34 of the tube wall is punched inwardly to provide the side opening aperture 36 with the severed wall portion being laid back inwardly in the tube to provide the upwardly and outwardly facing surface 34. Such inwardly bent wall portion is indicated at 38.

The upper end of wall portion 38 bears against the side wall of the tube opposite aperture 36 such that as the nail point 18 of a nail is driven downwardly through the tube, and engages the surface 34, the wall of the tube in abutment with portion 38 will tend to prevent such portion from collapsing downwardly as the nail point is deflected laterally outward through the aperture 36.

The nail 16 which is driven downwardly through the tube should be of a length such that when driven home, i.e. when the head 42 is in substantial abutment with the upper end of the tube 20, the pointed end 18 of the nail will have curled outwardly as shown in FIG. 1. It will be noted that the point 18 of the nail is disposed substantially directly below the periphery of the large head 26. A typical tube may have a length of approximately 6 inches, an outside diameter of 0.180 inches, and a nominal wall thickness of 0.030 inches, and be formed of 1020 carbon steel worked hardened to Rockwell B-90. Nail 16 may be similar to a box nail 7–8 inches in length with a shank diameter to nicely fit the tube and a head diameter to fairly overlie the upper end of the tube. A common wire box nail of sufficient length will be suitable for use with the tube.

Advantages of this invention flow from chisel point 40 at the tip of lower end 46 of tube 20. Chisel point 40 permits tube 20 to be driven straighter and forms a smaller hole in workpiece 10 than otherwise accomplished by the prior art fasteners. Accordingly, tube 40 may be driven into work pieces more consistently and with lesser play therewith.

The value of these advantages may be better understood when it is recognized that nail 16 curls optimally when deflecting surface 34 presents itself to nail end 18 at an angle from between about 15–22 degrees from the axis of tube 40. When the angle is greater than intended, nail 16 does not curl. Angles less than intended give insufficient curl and consequent inadequate purchase of the workpiece. As a result of this invention, anchor nail fasteners may be used with more consistent desired results.

It should be noted at the outset that chisel point 40 presents knife edge 48 to workpiece 10 as it is being driven therein. In addition, chisel point 40 is characterized by opposite side halves 50 and 52 of the tip of the lower end 46 that extend in a downwardly diminishing spaced relation that whets knife edge 48 of chisel point 40 at the bottom edge of opposite side halves 50 and 52. Thus, as tube 20 is being driven into workpiece 10, knife edge 48 cuts workpiece 10 while opposite halves 50 and 52 spread workpiece 10 thereabove. Accordingly, workpiece 10 retains significant integrity around tube 20 after it seats therein.

As illustrated in FIGS. 2–4, opposite side halves 50 and 52 extend substantially symmetrically inwardly and downwardly together in diminishing spaced relation so that workpiece 10 advantageously is spread evenly by both of opposite side halves 50 and 52. Also opposite side halves 50 and 52 substantially symmetrically mate along knife edge 48 so that such spreading begins at knife edge 48. Knife edge 48 has a thickness less than twice that of wall 60 of lower end 46 above chisel point 40.

Side opening aperture 36 opens above side 52 of chisel point 40. Opposite side halves 50 and 52, accordingly, act to stabilize the lower end of the tube when nail 18 is driven against deflecting surface 34. In addition, wall portion 62 of lower end 46 bows out slightly and enhances such stability.

The particular configuration of chisel point 40, best illustrated in FIGS. 3 and 4, is characterized by a special wedge-like configuration of opposite halves 50 and 52. Opposite halves 50 and 52 of the tip of lower end 46, respectively, extend inwardly and downwardly proceeding diagonally from upward of knife edge 48 at opposing uppermost center portions 70 and 72 of side halves 50 and 52 to opposite ends 74 and 76 of knife edge 48 at respective opposing pairs of lowermost corner portions of side halves 50 and 52 to mate the opposing pairs individually and lowermost portions therebetween of opposite side halves 50 and 52 and form knife edge 48 to a thickness less than twice that of wall 60 above chisel point 40. Opposite end 74 and 76 of knife edge 48 in this embodiment leave other portions of knife edge 48 with good results. As a consequence, knife edge 48 has a length from ends 74 to 76 greater than the outer diameter of tube 20 above chisel point 40. Moreover, the aforementioned lowermost corner portions of side halves 50 and 52 mate somewhat to either side of chisel point 40 at ends 74 and 76 of knife edge 48.

Having described this invention relative to the improvement of a preferred embodiment of this invention, it will be seen that other chisel points of this invention can be fabricated using these principles to achieve such an improvement.

I claim:

1. In an anchor nail fastener comprising, in combination, an elongated tubular member of resistingly deformable metal having upper and lower anchor ends to be driven lower end first into a workpiece, means adjacent the upper end of the member for limiting penetration of the member relative to the workpiece, the wall of said tubular member provided with a side opening aperture spaced upwardly from the lower end with a portion of the wall extending inwardly and upwardly from the lower edge of the aperture across the interior of the tubular member to the opposite interior wall face thereof to provide an upwardly facing surface for deflecting the point of a nail driven downwardly through the tubular member laterally outward through said aperture, the improvement which comprises said tube being formed of hardened carbon steel and having a hollow chisel point characterized by opposite halves of the tip of said lower end that extend in a downwardly diminishing spaced relation to form a knife edge at said chisel point along the bottom edges of said opposite side halves, said opposite side halves substantially symmetrically mating along said knife edge, said side opening aperture being open to the side of one of said opposite side halves, said knife edge having a thickness less than twice that of the wall of said chisel point, and the angle of the opposite halves of the tip acting as a wedge as the tube is driven lower-end-first into a workpiece.

2. In the invention of claim 1, the improvement wherein the opposite halves extend substantially symmetrically inwardly and downwardly in diminishing spaced relation to form said knife edge.

3. The invention defined by claim 1, wherein said tube has a length of at least approximately six inches.

* * * * *